3,410,665
APPARATUS FOR PRODUCING STRIATIONLESS BODIES OF METAL AND SEMICONDUCTOR SUBSTANCES CONTAINING IMPURITIES
Alfred Müller and Manfred Wilhelm, Nuremberg, Germany, assignors to Siemens Aktiengesellschaft, a corporation of Germany
Filed Aug. 14, 1964, Ser. No. 389,537
Claims priority, application Germany, Aug. 17, 1963, S 86,783
2 Claims. (Cl. 23—273)

ABSTRACT OF THE DISCLOSURE

Apparatus for producing solid bodies by normal freezing of impurity-containing crystalline substance, comprising an elongated crucible for containing the substance, heating means for melting the substance in said crucible, a heat-sink structure disposed predominantly outside said crucible and having a portion extending into said crucible near one end thereof to be immersed in the substance when the latter is molten, said extended portion having a planar front perpendicularly to the longitudinal axis of said crucible and facing the other end of said crucible, said crucible and heat-sink structure being jointly displaceable in the direction of said axis away from said heating means to cause normal freezing of the melt with a temperature gradient below the minimum at which temperature fluctuations occur at the liquid-solid phase boundary of the melt, the commencing phase boundary being planar and having, due to said planar front, a zero temperature gradient perpendicularly to the freezing direction. A method for producing striation free solid bodies is also described.

---

Figure 1:
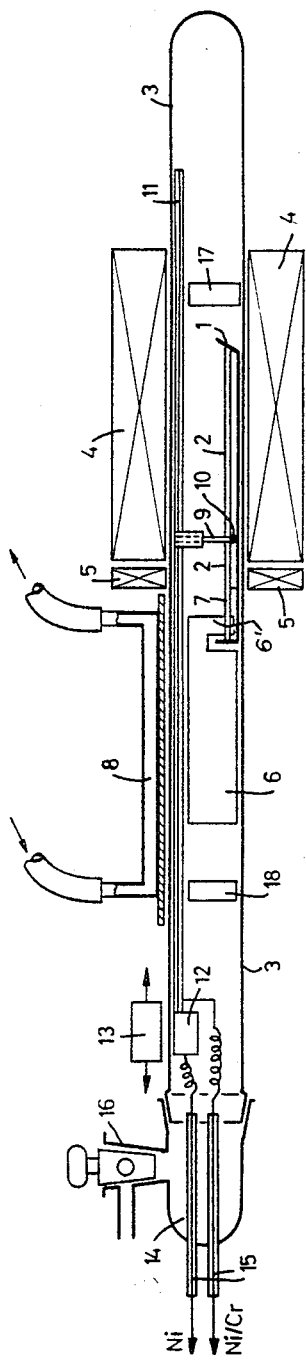

Our invention relates to the production of solid bodies of metals or semiconductors containing impurities by normal freezing of the molten substance and has as its object the obtainment of such bodies free of internal striation regions.

Various scientific and technological purposes require the use of crystalline semiconductor bodies which contain a prescribed amount of impurity atoms, for example donor or acceptor atoms which determine the conductance type of the semiconductor material. Such semiconductor crystals are employed for example in investigating the physical properties of semiconductor substances such as the energy level or band structure. They are also needed for producing electronic semiconductor components, including those based upon the p-n junction effect, for example diodes or transistors. Semiconductor crystals of the kind mentioned are also useful for utilizing the particular optical properties of certain semiconductor substances such as in infrared filters. Also required for purposes of semiconductor technology are crystals, possessing a precisely defined impurity-atom concentration, in which these atoms have an entirely uniform distribution in the semiconductor substance to provide for homogeneous properties. Inhomogeneities cause undesired effects, for example a poor blocking characteristic in rectifiers, or an anisotropic resistance change in semiconductors having a high carrier mobility.

In many cases, the requirement for homogeneity must also be met by crystals of pure metals which inevitably always contain traces of foreign impurity elements; and the same requirement must often be satisfied by metal-mixed crystals, as well as by mix crystals of semiconductor compounds such as those described in U.S. Patent 2,858,275, for example.

There are also cases in which it is desirable that heterogeneous systems, for example eutectic compositions, exhibit an absolutely uniform distribution of a dispersed phase in the embedding or host phase throughout the entire volume of the eutectic crystal. This applies for example to the heterogeneous materials described in copending application Ser. No. 273,776, filed Apr. 17, 1963, now Patent No. 3,226,225.

Inhomogeneities in semiconductor crystals may result, for example, from the fact that when the crystal is being pulled out of a melt, an impurity contained in the melt is built into the solid phase preferably in a given crystallographic direction. For example, it has been ascertained with reference to tellurium-doped indium antimonide, that Te becomes enriched in the <111>-direction with a distribution coefficient larger than 1. When during the crystallizing process there is formed, when seen from the solid phase, a convex solid-liquid phase boundary with a {111}-facet in the center, the Te-atom distribution is then not homogeneous throughout the cross section of the crystal, but has a maximum in the center of the cross section. This type of inhomogeneity is known in literature as "facet effect." It can be avoided by a properly chosen temperature program so as to avoid the formation of a {111}-facet, or by selecting a different crystal-pulling direction.

Inhomogeneities in semiconductor crystals and metal crystals may also result from the fact that the impurities or any added doping and alloying substances have a distribution coefficient smaller or larger than 1. Consequently, when metal or semiconductor melts are only once subjected to normal freezing (from one end to the other of the melt), there always occurs a concentration gradient in the crystal. That is, the foreign or impurity substances become enriched either in the first or in the last solidifying crystal portion. A concentration equalization, however, can be largely obtained by zone melting of the metal or semiconductor ingots in a direction opposed to that of the normal freezing. For example when semiconductor monocrystals are being pulled in a vertical direction, the enrichment or depletion of a dopant in the solid portion of the crystal can be avoided or minimized by continuously changing the concentration of this dopant in the melt.

There are also inhomogeneities which can be made visible as striations in normally frozen metal as well as in semiconductor crystals. Such striations constitute periodically repetitive changes in the composition of the crystal which extend over its entire cross section, parallel to the solid-liquid phase boundary in which the solid body has grown by crystallizing out of the molten substance.

Inhomogeneities in form of striations occur in semiconductor crystals and metal-mixed crystals. They are also observed in heterogeneous systems such as binary eutectic compositions subjected to normal freezing. For example, when one component B of the eutectic system AB is present only in the order of magnitude of a few percent by weight, then the striations manifest themselves in a periodic alternation of layers consisting of crystallized eutectic and the pure component A, and these layers extend substantially in a direction perpendicular to the freezing direction of the melt, despite the fact that the precise eutectic concentration of B in A was adjusted. If A and B are present in mutually comparable concentrations, then a periodic sequence of striations is observed in which the dispersed phase exhibits an enlarged grain size.

We have discovered that inhomogeneities in the form of striations in metal or semiconductor crystals produced by normal freezing are caused by periodic temperature fluctuations; and we have ascertained that such fluctuations always occur in metal or semiconductor melts if an appreciable temperature gradient is maintained along the liquid phase over a distance of more than 3 cm. These temperature fluctuations or oscillations cannot be explained by mechanical vibrations or jarring, nor by fluctuations in heat supplied to the melt. Nor are the temperature fluctuations predicated upon the presence of already crystallized material.

According to our invention, therefore, we prevent the occurrence of the above-mentioned striation-type inhomogeneities in crystals resulting from normal freezing, by maintaining, during normal freezing of the melt, the temperature gradient below the value at which periodic temperature fluctuations in the melt take place.

The method according to the invention is particularly well suitable for producing striation-free solid bodies of elemental metals containing impurities; of elemental and compound semiconductors containing dopant or other impurities, as well as for the production of striation-free eutectic compositions.

When during normal freezing or zone melting of a eutectic melt or a crystal or eutectic composition, there occur temperature fluctuations, then the solidified crystal of eutectic composition exhibits a periodic sequence of striations which alternately consist of the eutectic composition and of so-called "empty striations." Empty striations are those which consist only of the embedding or host component if the eutectic concentration of the dispersed phase is in the order of magnitude of a few percent by weight or less. If the two components are present in approximately equal concentrations, the striations of coarser and finer grains of the dispersed phase alternate periodically.

This type of inhomogeneity in semiconductor or metal eutectic compositions is also prevented by virtue of the method according to the invention, if during normal freezing the temperature gradient in the melt, relative to the advancing direction of freezing, is no more than 2° C. per cm., and if, when zone melting is applied, the molten zone is simultaneously not wider than 3 cm. However, the temperature gradient in the melt and particularly at the solid-liquid phase boundary should be zero or substantially zero in the direction perpendicular to the advance of freezing.

Figure 2:
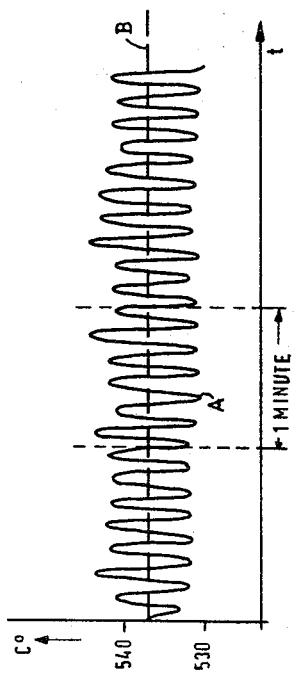

The invention will be further described with reference to the accompanying drawings in which FIG. 1 shows in longitudinal section an apparatus suitable for the normal freezing of metallic and semiconductor materials in the above-described manner and FIG. 2 is a graph of temperature fluctuations.

The apparatus comprises a box-shaped elongated quartz boat 1 roughened by sand blasting and subsequently carbonized. The quartz boat, for example, is about 30 cm. long, 2.5 cm. wide and 2.0 cm. high. The boat 1 serves for receiving the melt 2 and is located in a slightly inclined and longitudinally dispalceable quartz tube 3, whose inner diameter is 3.6 cm., it being understood that the numerical examples here given are related to one another and may be modified within wide limits and proportions.

The boat 1 is heated by a fixed and uniformly wound resistance furnace 4 of tubular shape which surrounds the quartz tube 3 along an axial distance of 33 cm. An additional radiation heater 5 in form of an annular tape of about 2 cm. width is additionally mounted about the quartz tube 3 at the outlet side of the furnace 4. A cylinder 6 of molybdenum serves for securing an oriented dissipation of heat from the melt 2. The cylinder 6 has a length of 20 cm. and a diameter of 3 cm. and forms at one end a finger 6' which is immersed in the melt 2 and, during normal freezing, becomes frozen into the first solidifying portion 7 of the ingot. The axial end face of the finger 6' is planar. At the beginning of the freezing operation, the heat dissipation from the melt to the molybdenum cylinder 6 cools the liquid-solid front and makes it substantially planar by virtue of the planar front face of finger 6'. In other words, while otherwise the freezing front would be curved, the heat sink with which the illustrated device is provided has the effect of straightening the front so as to obtain a defined heat gradient which has substantially the value zero in the direction transverse to the advancing direction of the solidification. While various other materials can be employed for the cylindrical heat-sink body 6, it is preferably made of molybdenum when the material to be processed consists of indium antimonide, InSb, because molybdenum, aside from having a good heat conductivity, is not soluble in InSb and has no doping effect upon InSb. Other materials of which the cylindrical body 6 may be made are graphite, SiC or $Al_2O_3$ (sintered alumina). The heat-sink body 6 may be water cooled.

In the illustrated embodiment, the quartz tube 3 is covered on its top side by a water-cooled copper roof 8 which is fixedly mounted close to the outlet side of the furnace 4 and has a length of about 30 cm.

The temperature is measured by means of a thermal couple. Suitable for this purpose is an Ni-NiCr thermal couple. In order to have the temperature distribution in the melt or in the frozen eutectic disturbed as little as possible by heat dissipation through the thermocouple, its electric leads of 0.1 mm. diameter are passed through a tube 9 of heat-insulating material having two parallel bores traversed by the respective wires. The junction of the thermocouple is protected by a small heat-insulating cap 10. The temperature sensor is fastened on a quartz rod 11 resting on two blocks 17 and 18 of molybdenum sheet material. A small permanent magnet 12 near the open end of the quartz tube 3, coacting with a second displaceable magnet 13 outside of the sealed apparatus, permits shifting the quartz rod 11 with the temperature sensor through the melt in a direction parallel to the longitudinal axis of the boat 2.

The quartz tube 3 with the thermocouple, boat 1 and molybdenum cylinder 6 are sealed by means of a ground glass cap 14 which has two sealed lead-ins 15 for the wire of the thermocouple and a cock 16 for evacuating the tube 3 and for rinsing it for example with argon. Preferably the quartz tube 3 is filled with argon of 0.5 atmosphere pressure prior to each use.

A graph of these temperature fluctuations is illustrated in FIG. 2, curve A, of the accompanying drawing. The temperature fluctuations were observed during any chosen period of time under constant external operating conditions and it was found that vibrating or jarring of the equipment had no effect upon these fluctuations. The usual voltage fluctuations in the resistance furnace were likewise found to have no effect upon the fluctuations. Even when the heating of the furnace was discontinued, temperature fluctuations of the described kind continued to be observed as long as the material remained liquid. Different electrical measuring circuits were used, also without affecting the occurrence of temperature fluctuations.

Following is an example of an operation performed with the above-described apparatus.

360 g. indium antimonide (InSb) with $10^{17}$ atoms tellurium per cm.$^3$ were charged into the quartz boat 1. The temperature measurements in the molten InSb made by means of the above-described measuring equipment had the following result.

With a properly adjusted furnace temperature, the thermocouple 10 placed into the middle of the melt indicated a median temperature of 720° C. By shifting the thermocouple toward the furnace outlet, a temperature gradient of about 15° C./cm. was measured. The measurements were made at a large number of longitudinally spaced points. It was found that periodic temperature fluctuations of maximally 9° C. occurred at each measuring point with a frequency of 0.1 cycle per second. When the quartz tube 3 with the boat 1 and the melt 2, including the thermocouple, was pulled at constant speed out of the furnace, the melt freezes, at the rate in which it leaves the furnace, at a temperature of 510° C. Tellurium then becomes built into the polycrystalline InSb ingot with an alternating concentration resulting in periodically recurring striations. These striations can be made visible by etching or also by electrical measuring.

The forward end of the melt, cooled by the molybdenum cylinder, was located at the end of the heating zone, i.e. at the end of the radiation tape heater. The measuring point of the thermocouple was immersed into the melt at a point spaced 14 cm. from the cooled end and was located approximately in the middle of the melt. The immersion depth was about 3 mm. After two hours of constant heating, temperature equilibrium in the apparatus was reliably obtained. The quartz tube with the boat and its content, including the thermocouple, was then pulled at constant speed out of the furnace with the aid of the motor operating at a speed of 1.67 mm. per minute. After about 90 minutes, the thermocouple arrived at the liquid-solid phase boundary and from then on was frozen into polycrystalline InSb. The thermal voltage generated by the thermocouple during this period of time was recorded and the median temperature, the median temperature fluctuation and the frequency were derived from the resulting graph. The median temperature of the melt in the test described declined 10 to 20° C. per cm. from the original location of the thermocouple to the phase boundary, and thereafter by about 100° C. per cm. in the crystallized InSb. In the melt there occurred seven to eight temperature fluctuations per minute with a median temperature difference of about 9° C. The highest temperature fluctuations were recorded in the region of the melt adjacent to the locality of the largest temperature gradient. It was found that an increasing gradient results in an increasing amplitude of the temperature fluctuation. The same observation was made with all other tests regardless of the particular material involved.

A number of InSb ingots were produced in the above described manner except that the rate of crystalline growth was set to respectively different values between 0.3 and 3.4 mm./min. It was found that the amplitude of the temperature fluctuations and their frequency for a constant heating and cooling are not affected by the speed with which the quartz tube with the boat and thermocouple is pulled out of the furnace. With increasing pulling speed the distance between the striations was found to increase accordingly (microphotographs published in the below-mentioned German paper Figs. 8, 9 and 10). However, when the current supplied to the furnace was reduced (from 4.67 amps to 4.17 amps) and the radiation tape was additionally heated, employing a pulling speed of 1.67 mm./min., the median temperature gradient in the melt declined below 2° C./cm. Under these conditions, no periodic temperature fluctuations could be ascertained by any available means and the resulting ingots were found to be free of any striations. The recorded temperature curve corresponded to the one shown by a broken line B in FIG. 2 of the accompanying drawing.

Polycrystalline ingots produced in the above described manner were ground and polished with diamond paste (grain size up to 0.25 micron) and thereafter etched for a few seconds with CP4 (20 parts by volume of $HNO_3$, 15 parts HF, 12 parts $CH_3COOH$ and 0.24 part $Br_2$). The ingot exhibited periodically recurring striations. These striations corresponded to the shape of the liquid-solid phase boundary in which the InSb crystallized and extended over the entire cross section of the ingot through all crystallites.

Microphotographs of such striated cross sections have been published by us in Zeitschrift für Naturforschung, volume 19a, No. 2, 1964, pages 254 to 263 (note Figs. 1, 2, 8 to 10).

When the operation is repeated at such a low furnace temperature that the thermocouple in the middle of the melt measures only about 540° C., the temperature in the melt exhibits toward the furnace outlet a gradient of approximately 1° C./cm. only. Under these conditions, the thermocouple senses no temperature fluctuations. Striations cannot be ascertained either by etching or by electrical measuring in the polycrystalline InSb growing from this melt.

Periodic temperature fluctuations have also been found to occur in the liquid phase of the melt occurring in zone-melting operations. An ingot of a eutectic InSb/NiSb composition (containing 1.8% NiSb, balance InSb) of 30 cm. length, 2.5 cm. width and 1 cm. height was placed into a horizontal quartz boat. The boat was surrounded by a ring-shaped tape radiation heater. The tape consists of resistance material and can be heated by passing current therethrough, for example, alternating current of 50 c.p.s. line frequency. When producing a molten zone of 4 cm. length and employing a thermocouple in the above-described manner, temperature fluctuations of approximately 2.5° C. and a temperature gradient of about 20° C./cm. were measured. The crystallized eutectic, after etching, exhibited periodically recurring striations consisting of InSb and of the InSb/NiSb eutectic respectively.

When the same operation is repeated at a reduced heating power of the radiation heater, the liquid phase is shortened. When it is made shorter than 3 cm., it continues to exhibit a median temperature gradient of 20° C./cm., but no temperature fluctuations are observed, and the crystallized eutectic is found to be free of any striations.

In subsequent cases, similar temperature fluctuations were also discovered in other molten substances. For example, they were ascertained at 250° C. in indium and at 100° C. in mercury. However, no such temperature fluctuations were found to occur in water and other liquids such as ethylene glycol. We found that generally in molten semiconductors and metals, such temperature fluctuations will occur under constant external conditions.

Used for zone melting was the same apparatus as shown in FIG. 1 of the drawing except that the furnace was not heated and only the tape-shaped radiation heater was used and no cooling by means of the molybdenum cylinder and the water-cooled roof structure was employed. Furthermore, the boat containing the melt was given the shape of a semicylinder of 20 mm. diameter and the quartz tube was inclined 14° toward the horizontal. Molten InSb was subjected to normal freezing and the thermocouple was thus frozen into the solid phase. Thereafter, the ingot was subjected in the boat to zone melting by means of the heated radiation tape at a zone-travelling speed of 0.8 mm./min. The axial length of the molten zone could be varied by correspondingly varying the heating power supplied to the radiation heater.

The invention is applicable in an analogous manner to other crystalline materials such as: InSb containing impurity atoms other than Te, for example, Se; other compound semiconductor substances such as GaAs, GaP, InAs, AlSb with impurity atoms such as S, Te, Se; elemental semiconductors and metals Ge, Si with dopants such as Ga, Sb, As or other impurity atoms such as $O_2$, also Sn, Bi, In, Ag, Al. It will be understood that when reference is made in this specification to impurities or impurity atoms, the concentrations or percentages involved in electronic semiconductors are extremely small so that the materials are still considered to be of high or ultra-high purity. As to metallic crystals, the proportion of impurities may be higher but still remains a small fraction of 1% or less in most cases while the use of the invention is technologically or commercially significant.

We claim:
1. Apparatus for producing solid bodies by normal freezing of impurity-containing crystalline substance, comprising an elongated crucible for containing the substance, heating means for melting the substance in said crucible, a heat-sink structure disposed predominantly outside said crucible and having a portion extending into said crucible near one end thereof to be immersed in the substance when the latter is molten, said extended portion having a planar front perpendicularly to the longitudinal axis of said crucible and facing the other end of said crucible, said crucible and heat-sink structure being jointly displaceable in the direction of said axis away from said heating means to cause normal freezing of the melt with a temperature gradient below the minimum at which temperature fluctuations occur at the liquid-solid phase boundary of the melt, the commencing phase boundary being planar and having, due to said planar front, a zero temperature gradient perpendicularly to the freezing direction.

2. Apparatus for producing solid bodies by normal freezing of impurity-containing crystalline substance, comprising an elongated crucible for containing the substance, heating means for melting the substance in said crucible, a heat-sink structure disposed predominantly outside said crucible and having a portion extending into said crucible near one end thereof to be immersed in the substance when the latter is molten, said extended portion having a planar front perpendicularly to the longitudinal axis of said crucible and facing the other end of said crucible, said crucible and heat-sink structure being jointly displaceable in the direction of said axis away from said heating means to cause normal freezing of the melt, and drive means for displacing said crucible and structure in said direction at a rate corresponding to a maximum temperature gradient of 2° C. per cm. in the melt at the liquid-solid phase boundary.

References Cited
UNITED STATES PATENTS

| | | | |
|---|---|---|---|
| 2,679,080 | 5/1954 | Olsen | 148—1.6 |
| 2,889,240 | 6/1959 | Rosi | 148—1.6 |
| 2,977,258 | 3/1961 | Dunkle | 23—301 |
| 3,002,824 | 10/1961 | Francois | 148—1.6 |
| 3,033,660 | 5/1962 | Okkerse | 23—301 |
| 3,234,012 | 2/1966 | Siebertz et al. | 148—1.6 |
| 3,240,568 | 3/1966 | Derby et al. | 23—301 |
| 3,265,469 | 8/1966 | Hall | 23—301 |
| 3,291,571 | 12/1966 | Dohmen et al. | 148—1.6 |

L. DEWAYNE RUTLEDGE, *Primary Examiner.*

DAVID L. RECK, P. WEINSTEIN,
*Assistant Examiners.*